United States Patent [19]

Ledzius et al.

[11] Patent Number: 5,504,751
[45] Date of Patent: Apr. 2, 1996

[54] METHOD AND APPARATUS FOR EXTRACTING DIGITAL INFORMATION FROM AN ASYNCHRONOUS DATA STREAM

[75] Inventors: Robert C. Ledzius, Austin; James S. Irwin, Paige, both of Tex.

[73] Assignee: Motorola Inc., Schaumburg, Ill.

[21] Appl. No.: 334,975

[22] Filed: Nov. 7, 1994

[51] Int. Cl.$^6$ .................................................. H04J 3/06
[52] U.S. Cl. ..................... 370/100.1; 375/355; 375/360
[58] Field of Search ...................... 370/100.1; 375/94, 375/95, 108, 354, 355, 360, 371, 373–376

[56] References Cited

U.S. PATENT DOCUMENTS

| | | | |
|---|---|---|---|
| 4,841,489 | 6/1989 | Ozaki et al. | 367/103 |
| 4,881,059 | 11/1989 | Saltzberg | 375/354 |
| 4,910,755 | 3/1990 | Knapp | 375/120 |
| 5,105,447 | 4/1992 | Iwade | 375/360 |
| 5,134,637 | 7/1992 | Beyer et al. | 375/373 |
| 5,196,853 | 3/1993 | Abbiate et al. | 341/143 |
| 5,197,082 | 3/1993 | Uda et al. | 375/4 |
| 5,260,836 | 11/1993 | Yada et al. | 360/32 |
| 5,282,223 | 1/1994 | Muramatsu | 375/360 |
| 5,313,496 | 5/1994 | de Goede | 375/95 |
| 5,363,416 | 11/1994 | Kim | 375/106 |
| 5,450,450 | 9/1995 | Lee | 375/354 |

OTHER PUBLICATIONS

Adams, et al.; "A Stereo Asynchronous Digital Sample–Rate Converter for Digital Audio;" IEEE Journal of Solid–State Circuits; vol. 29; No. 4; pp. 481–488 (1994).

Horn, et al.; "An Overview Of Digital Audio D/A Converters;" Mixed Signal and Audio Design Conf. sponsored by Computer Design San Jose (Jul. 12, 1994).

*Primary Examiner*—Hassan Kizou
*Assistant Examiner*—Seema Rao
*Attorney, Agent, or Firm*—Timothy W. Markison

[57] ABSTRACT

A method and apparatus for extracting digital information (111) from an asynchronous data stream (101) is achieved by providing a data stream (101) that is clocked at a data stream clock rate (210). A sampled data stream (103) is produced by sampling the asynchronous data stream at a first clock rate (105), which is independent of the data stream clock rate (210). Using the sampled data stream (103), a recovered clock (107) is generated. The recovered clock (107) is then used to extract the digital information (111) from the sampled data stream (103).

19 Claims, 7 Drawing Sheets

METHOD AND APPARATUS FOR EXTRACTING DIGITAL INFORMATION FROM AN ASYNCHRONOUS DATA STREAM

TECHNICAL FIELD OF THE INVENTION

This invention relates generally to circuits, and more specifically to a method and apparatus for extracting digital information from an asynchronous data stream in circuits.

BACKGROUND OF THE INVENTION

Digital audio equipment such as Compact Disc (CD), Digital Audio Tape (DAT), a multimedia system, or a digital telephone network are commonly used for high-quality transmission, reproduction, and processing audio signals in the form of digital audio signals. These digital audio signals are comprised of a series of numbers that represent an analog audio signal at successive instants of time. Digital audio signals can be manipulated using current digital signal processing (DSP) technology to achieve very powerful processing functions that are not available for analog audio signals, and digital audio signals are much less susceptible to noise in both wired and wireless transmission techniques. Thus, digital audio signals can be transmitted across very noisy transmission media and suffer no loss of information, as the receiver must only determine whether a one or a zero was transmitted in order to recover the digital information from the digital audio signal.

Transmission of digital information is known. In some cases of digital information transmission, the digital information is transmitted as a data stream synchronous to a data stream clock. In many cases, the data stream clock is not known in the system that is receiving the transmitted digital information, thus making the data stream asynchronous to the receiving system and more difficult to recover.

A common prior art solution used to recover the digital information from the asynchronous data stream is to recover the data stream clock by making a part of the receiving system synchronous to the data stream. To make the receiving system synchronous to the data stream, an analog phase-locked-loop (PLL) is added to the receiving system. The analog PLL generates a recovered clock whose frequency matches that of the data stream clock and maintains the accuracy of the recovered clock via feedback. While analog PLLs can accurately recover the data stream clock, it is not without costs. For example, analog PLLs can require a relatively large amount of additional analog circuitry, which increases both the size and complexity of the receiving system. In a digital integrated circuit application, the additional analog circuitry may require significant die area and additional process steps. In addition, the functionality of the analog PLL may be susceptible to noise from the digital system, which can result in errors.

Therefore, a need exists for a method and apparatus that extracts data, or digital information, from an asynchronous data stream while minimizing the additional analog circuitry, cost, and susceptibility to noise.

DETAILED DESCRIPTION OF THE DRAWINGS

Generally, the present invention provides a method and apparatus for extracting digital information from an asynchronous data stream. This is accomplished when a data stream that is clocked at a data stream clock rate is received. The data stream is sampled at a first clock rate to produce a sampled data stream, wherein the first clock is asynchronous to the data stream clock rate. A recovered clock is produced from the sampled data stream, wherein the recovered clock has the same frequency as the data stream clock rate, but is synchronous to the first clock. The recovered clock is then used to extract the digital information from the sampled data stream. Such a method and apparatus eliminates the need for a PLL and thus minimizes the additional circuitry, cost, and susceptibility to noise that customarily accompany PLL circuits.

Figure 1:
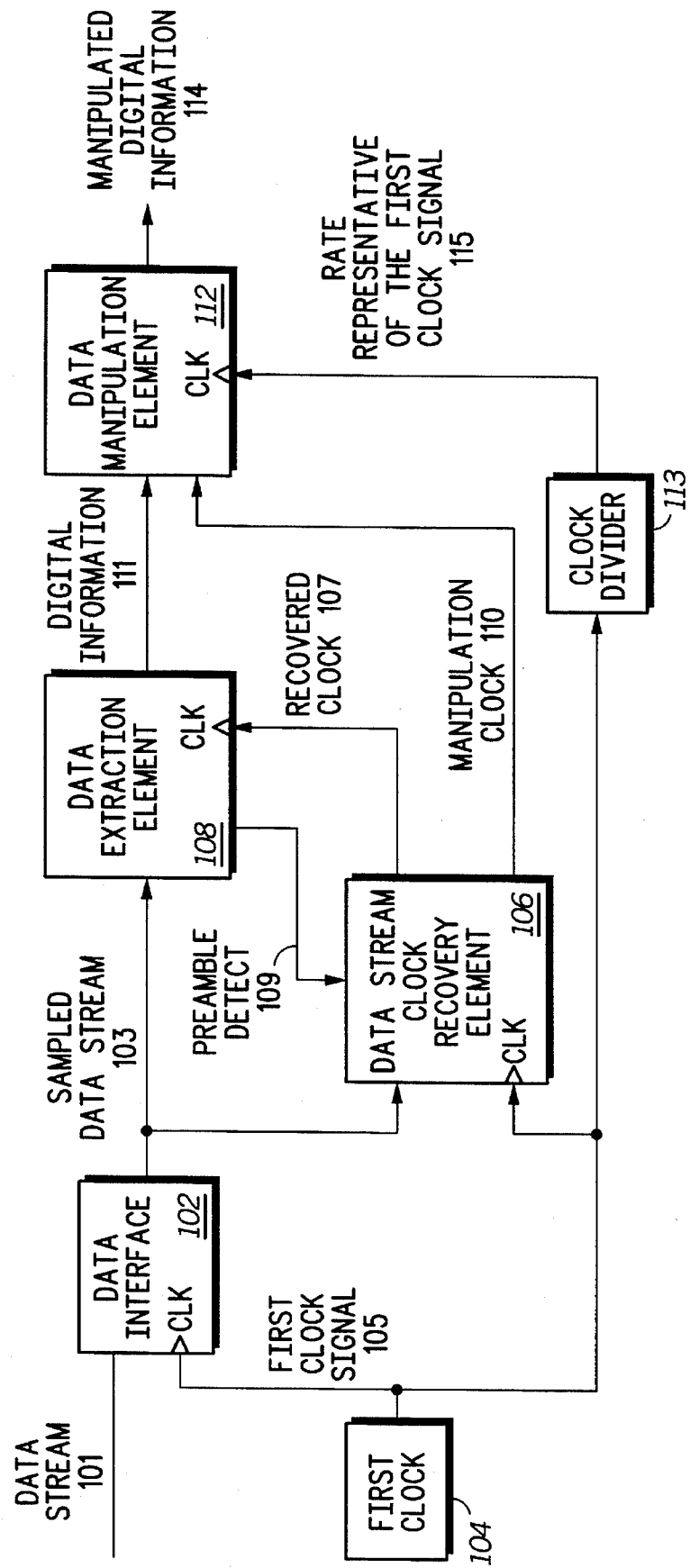
FIG. 1 illustrates a schematic diagram of a circuit for extracting digital information from an asynchronous data stream in accordance with the present invention.

FIG. 1 illustrates a circuit 100 for extracting digital information 111 from an asynchronous data stream 101, wherein the circuit 100 includes a first clock 104, a data interface 102, a data stream clock recovery element 106, a data extraction element 108, a data manipulation element 112, and a clock divider 113. The first clock 104 produces a first clock signal 105, which is a low noise clock that could be supplied by a crystal oscillator. The data stream 101 contains digital information 111 formatted at a data stream clock rate. The data stream 101 can be any data stream that contains digital information. For example, the data stream 101 could be the output from a CD player, a DAT deck, or another source of a digital audio signal. The data interface 102 samples the data stream 101 using the first clock signal 105 to produce a sampled data stream 103, wherein the first clock signal 105 is asynchronous to and at a greater frequency than the data stream clock. The sampled data stream 103 is thus synchronous to the first clock signal 105.

The data stream clock recovery element 106, which is further described below, uses the sampled data stream 103 and the first clock signal 105 to produce a recovered clock 107, wherein the recovered clock 107 is a close approximation to the data stream clock. Because the first clock signal 105 is asynchronous to the data stream 101, the recovered clock 107 will have frequency modulation. The modulation can be made inconsequential if the first clock 104 is chosen such that the difference frequency of the modulation is high enough that it is imperceptible in the application system. The data extraction element 108 uses the recovered clock 107 to extract the digital information 111 from the sampled data stream 103. The extraction is straightforward, as the recovered clock 107 is at the same frequency as the data stream clock rate. The data extraction element 108 also produces a preamble detect signal 109, wherein the data stream clock recovery element 106 uses the preamble detect signal 109 along with the recovered clock 107 to produce a manipulation clock 110. The preamble detect signal 109 indicates a specific position in the data stream 101, wherein specific sections of the digital information 111 can be located in the data stream 101 by using the preamble detect signal 109 as a reference. For example, if the digital information 111 includes data for a left audio channel and a right audio channel, the preamble signal 109 may be used to determine where the data for each channel is located in the digital information 111, and it can be routed accordingly.

The data manipulation element 112, which is clocked by a rate representative of the first clock signal 115, uses the manipulation clock 110 to manipulate the digital information 111 to produce manipulated digital information 114. For example, if the digital information 111 includes data for a left audio channel and a right audio channel, the data manipulation element 112 may separate the left channel data from the right channel data. The clock divider 113 divides the first clock signal 105 by a divisor to produce the rate representative of the first clock signal 115.

Figure 2:
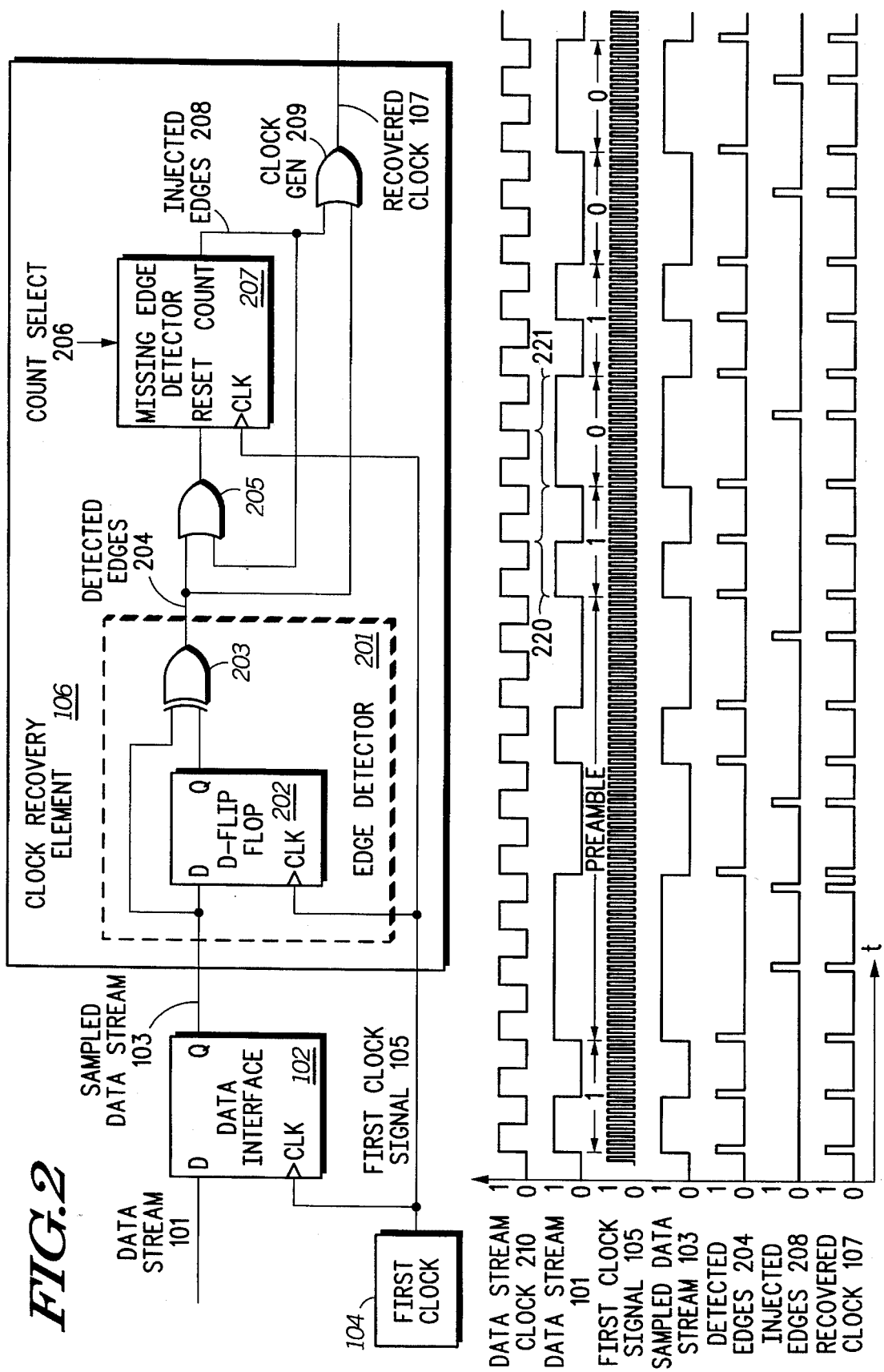
FIG. 2 illustrates a schematic diagram of a clock recovery element in accordance with the present invention.

FIG. 2 illustrates a more detailed block diagram of the clock recovery element 106, and a timing diagram that depicts an example of clock recovery. An example data stream 101, along with the data stream clock 210, is shown in the timing diagram, wherein the data stream 101 is synchronous to the data stream clock 210. The data stream 101 contains digital information 111 that is formatted using the data stream clock 210. In the data stream 101, the digital information 111 is formatted such that a high or "1" value is represented as two adjacent opposite values 220, while a zero in the data stream 101 is represented as two adjacent values that are the same 221. Thus, two periods of the data stream clock are necessary for every bit of digital information 111 that the data stream 101 contains. For example, the data stream 101 sequence "1-1 -0-1-0-0" represents the digital bits "0-1-0". Note that the polarity of the data stream 101 always changes on the border of a bit of digital information, thus two adjacent zeros would be represented as "1-1-0- 0". The unique case where three identical values are adjacent in the data stream 101 is used to signal the beginning of the preamble, which is a special sequence used in the extraction and processing of the digital information 111.

The clock recovery element 106 depicted in FIG. 2 comprises an edge detector 201, a missing edge detector 207, and a clock generator 209. The edge detector 201, which is comprised of an exclusive-OR gate 203 and a D-flip flop 202 clocked by the first clock signal 105, compares the current value of the sampled data stream 103 with the previous value. If the current value and the previous value are the same, no edge is detected, and the detected edges signal 204 will be a zero. If the current value and the previous value are different, an edge is detected, and the detected edges signal 204 will go high for one period of the first clock signal. This is illustrated in the timing diagram of FIG. 2.

The missing edge detector 207 is used to measure the time between edges detected by the edge detector 201 and produces an injected edge 208 when a predetermined time, which is measured using the first clock signal 105, has elapsed since the last detected or injected edge. The missing edge detector 207 is reset synchronously by the OR gate 205 whenever a high is produced on the detected edges 204 or injected edges 208 signals. In FIG. 2, the missing edge detector 207 is comprised of a counter, which counts on each rising edge of the first clock signal 105. The predetermined time that it measures is determined by count select 206.

The clock generator 209, which may comprise an OR gate, combines the detected edges 204 with the injected edges 208 to produce the recovered clock 107. As can be seen in the timing diagram of FIG. 2, the recovered clock 107 is a modulated version of the data stream clock 210, wherein the recovered clock 107 duplicates the frequency of the data stream clock 210.

Figure 3:
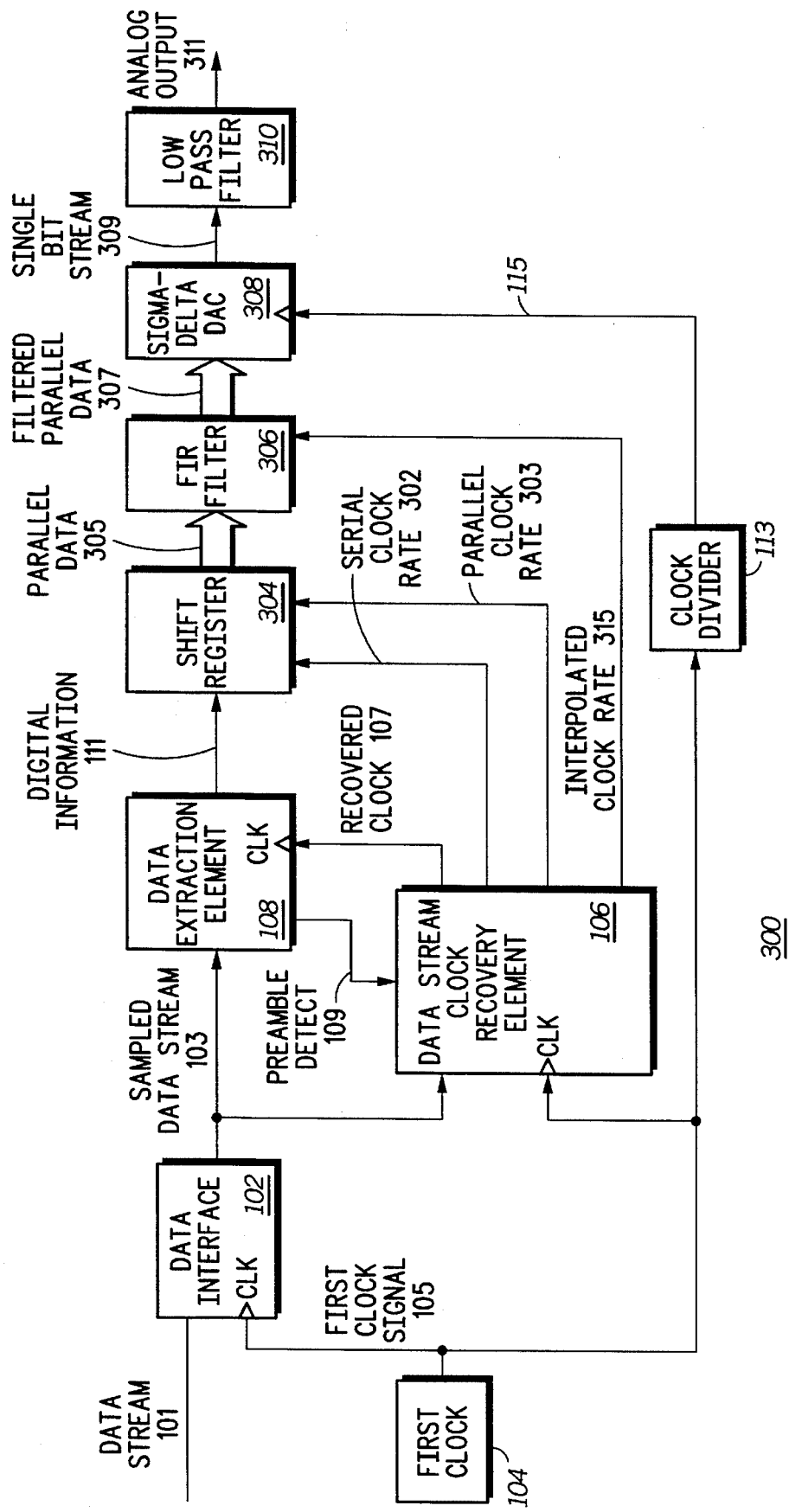
FIG. 3 illustrates a schematic diagram of a digital to analog converter (DAC) in accordance with the present invention.

FIG. 3 illustrates a DAC 300 which is comprised of a first clock 104, a data interface 102, a data stream clock recovery element 106, a data extraction element 108, and a clock divider 113. The manipulation clock 110 that is produced by the data stream clock recovery element 106 is further comprised of a serial clock rate 302, a parallel clock rate 303, and an interpolated clock rate 315. The other elements that comprise the DAC 300 include a shift register 304, a finite impulse response (FIR) filter 306, a sigma-delta DAC 308, and a low pass filter (LPF) 310.

The shift register 304 uses the serial clock rate 302 and the parallel clock rate 303 to convert the digital information 111, which is in a serial format, to parallel data 305. The shift register 304 is further detailed in FIG. 5 below. The FIR filter 306 filters the parallel data 305 according to predetermined coefficients at the interpolated clock rate 315 to produce filtered parallel data 307. The FIR filter 306 can be used to insert interpolated intermediate values between the values of the data in the parallel data 305. The number of interpolated intermediate values that are inserted is based on the ratio of the interpolated clock ram 315 to the parallel clock rate 303. The sigma-delta DAC 308 converts, using the rate representative of the first clock signal 115, the filtered parallel data 307 to a single bit stream 309. The LPF 310 converts the single bit stream 309 to an analog output 311, which is further illustrated in FIG. 4.

Figure 4:
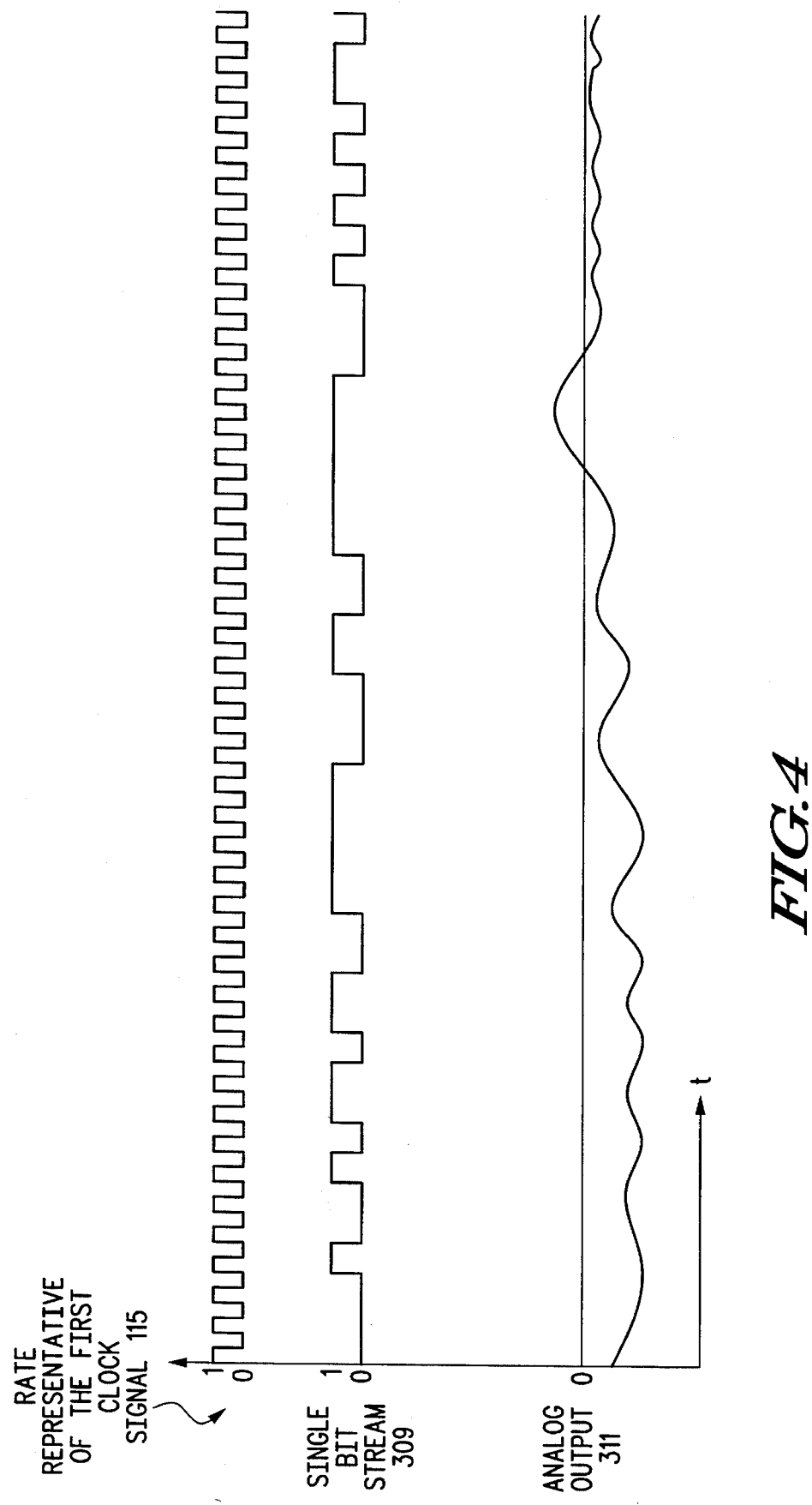
FIG. 4 illustrates, in a timing diagram, the function of a low pass filter in accordance with the present invention.

The function of the LPF 310 is further illustrated in FIG. 4. It is shown in FIG. 4 that zeros in the single bit stream 309 result in the reduction of the magnitude of the analog output 311, while ones result in the increase of the magnitude. A simple example of a LPF 310 that would perform this function is an integrator.

Figure 5:
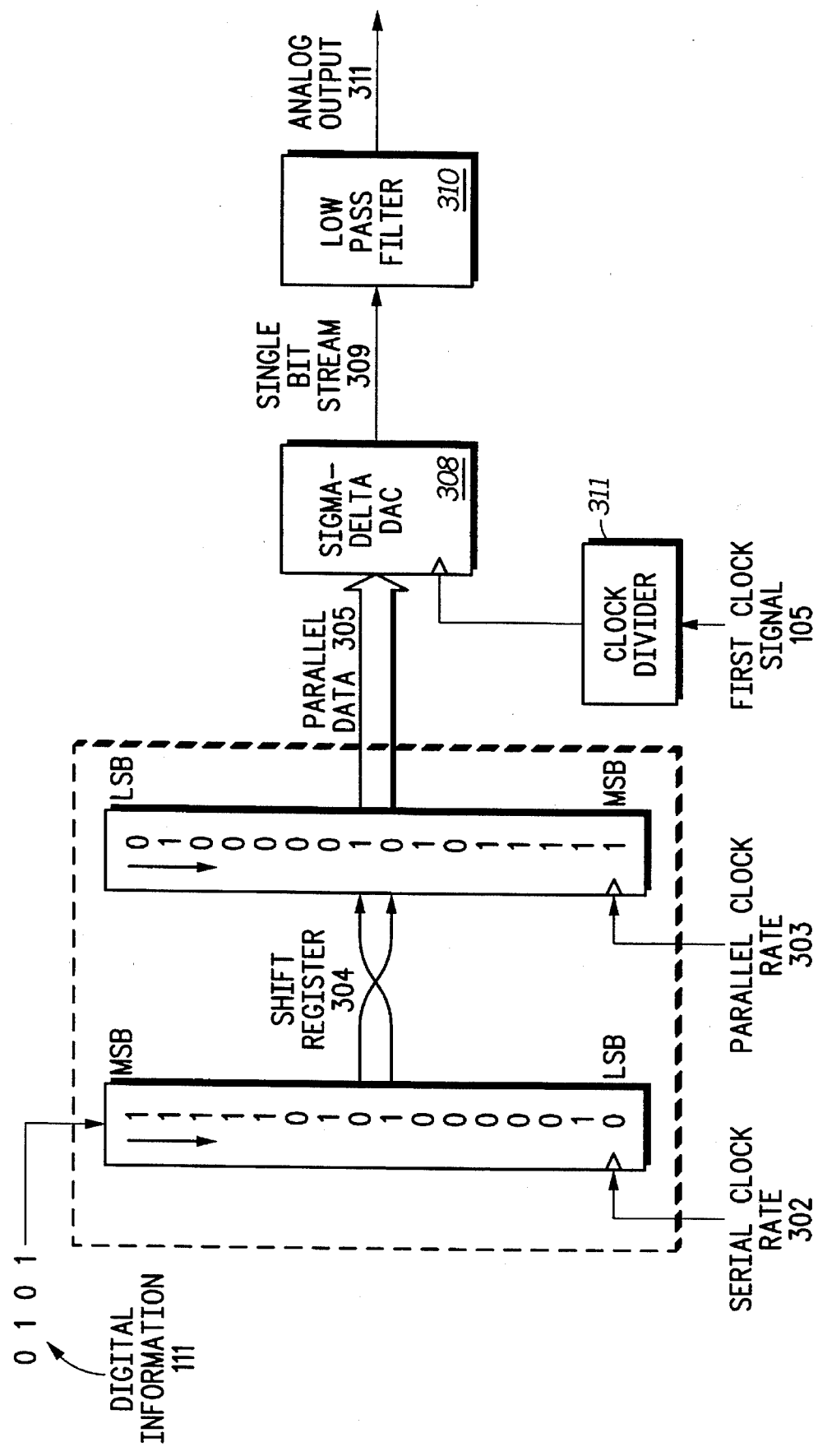
FIG. 5 illustrates a schematic diagram of a shift register in accordance with the present invention.

FIG. 5 illustrates the shift register 304 in more detail. The digital information 111 is clocked into the shift register 304 at the serial clock rate 302. If the digital information 111 is in least-significant-bit-first (LSB) format, it is converted to most-significant-bit-first (MSB) format. The digital information 111 may contain extra status and control bits, such as the preamble sequence, that are not used by the sigma-delta DAC 308. These extra bits are allowed to shift through the shift register 304 without being passed out as parallel data 305. When the desired bits of the digital information 111 are in the shift register 304, the parallel clock ram 303 is used to output parallel data 305.

The interpolated clock rate 3 15 controls the length of time that the filtered parallel data 307 is presented to the sigma-delta DAC 308, wherein the presentation time directly affects the analog output 311. For perfect recovery of a digital audio signal that may be present in the digital information 111, an ideal presentation time which is based on the data stream clock 210, is used. The data stream clock 210, however, is asynchronous to the system, and the interpolated clock rate 315 is synchronous to the first clock signal 105. Therefore, the actual presentation time is an approximation of the ideal presentation time, wherein the actual presentation time is the ideal presentation time synchronized to the first clock signal 105.

Due to the difference between the actual presentation time and the ideal presentation time, the sigma-delta DAC 308 will produce a representation of the desired audio signal that includes low-level frequency modulation error. The sigma-delta DAC 308 is clocked by the rate representative of the first clock signal 115, which is provided by a low-noise clock source, such as a crystal oscillator. This low-noise clock source is important, as it allows the sigma delta DAC 308 to realize its full dynamic range. The low-level frequency modulation that is introduced by the clean clock being asynchronous to the data stream clock 210 is imperceptible in high fidelity audio applications.

In an example application of FIG. 3, the data stream 101 is formatted in CD format, wherein the frequency of the data stream clock 210 is 44.1 kHz. If a first clock 104 that has a frequency of 22.8 MHz is used in this example, the difference frequency, or modulation frequency, to the nearest 44.1 kHz multiple is 21.9 kHz, which is a frequency beyond the range of human hearing. Thus, if the system in FIG. 3 is used to convert a CD data stream 101 to an analog signal 311, wherein the analog signal 311 produces audio output, the error introduced by the modulation caused by the first clock 104 being asynchronous to the data stream clock 210 will be imperceptible to a human listener.

Figure 6:
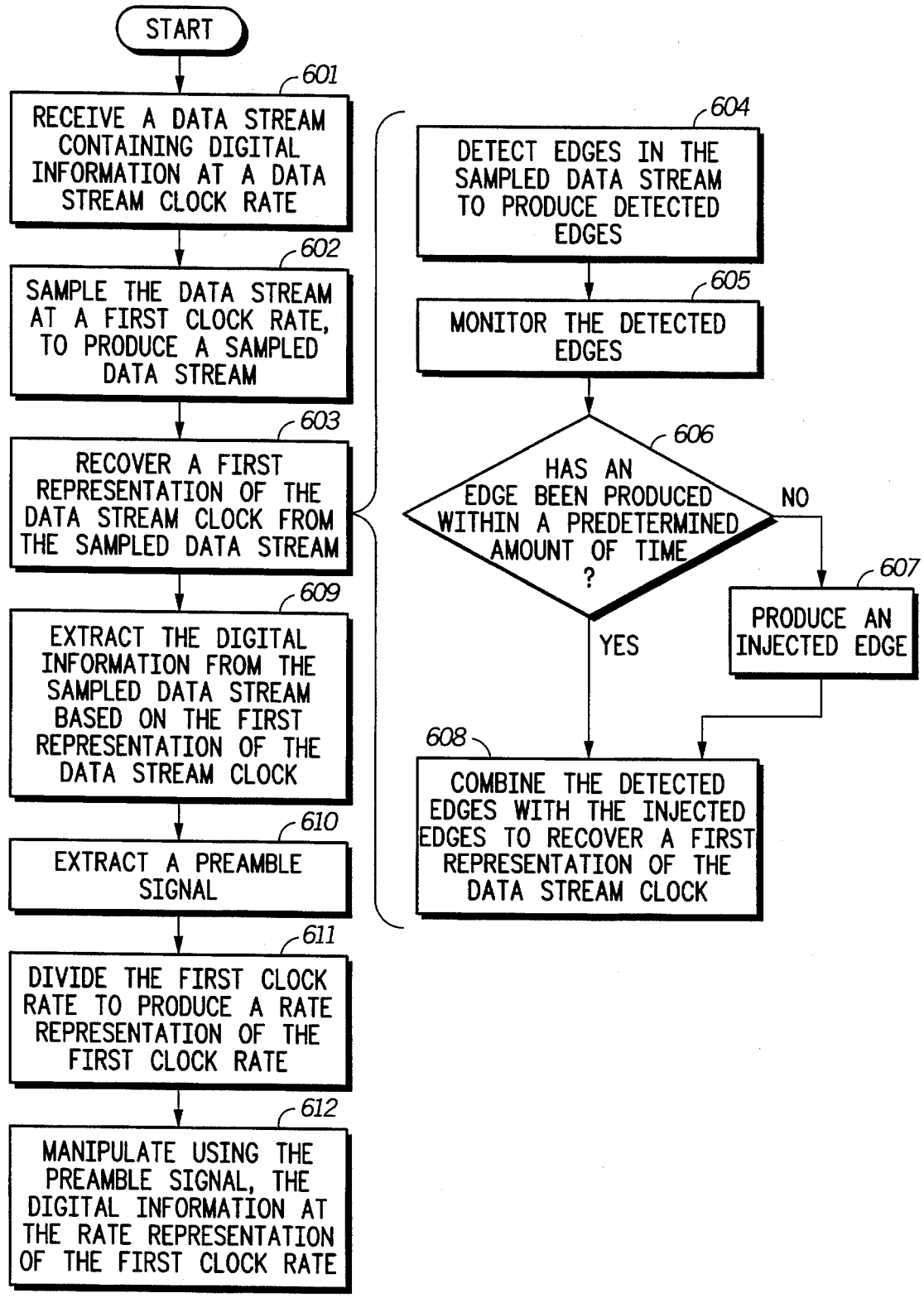
FIG. 6 illustrates, in a logic diagram, a method for extracting digital information from an asynchronous data stream in accordance with the present invention.

FIG. 6 illustrates a logic diagram that may be used to implement an embodiment of the present invention. At step 601, a data stream is received that contains digital information, wherein the digital information is formatted at a data stream clock rate. This data stream may be the output of a multimedia device, CD player, or any other source of a data stream containing digital information. In step 602 the data stream is sampled at a first clock rate to produce a sampled data stream, wherein the first clock rate is asynchronous to the data stream clock rate. The first clock rate is chosen, based on the data stream clock rate and the application, so that any resulting error from the modulation difference will be imperceptible.

At step 603, a first representation of the data stream clock is recovered from the sampled data stream. Step 603 can be further comprised of steps 604–608. Edges in the sampled data stream are detected in step 604, producing detected edges. The detected edges are monitored at step 605. At step 606 it is determined if an edge has been produced within a predetermined amount of time. If an edge has not been produced in the predetermined amount of time, step 607 produces an injected edge. The detected edges are combined with the injected edges in step 608 to produce the first representation of the data stream clock.

In step 609, the digital information is extracted from the sampled data stream based on the first representation of the data stream clock. At step 610 a preamble signal is further extracted from the sampled data stream. The preamble signal can be used as a reference point in the data stream to locate specific digital information that is desired.

The first clock rate is divided by a divisor in step 611 to produce a rate representative of the first clock. At step 612, the digital information is manipulated, using the preamble signal, at the rate representative of the first clock.

Figure 7:
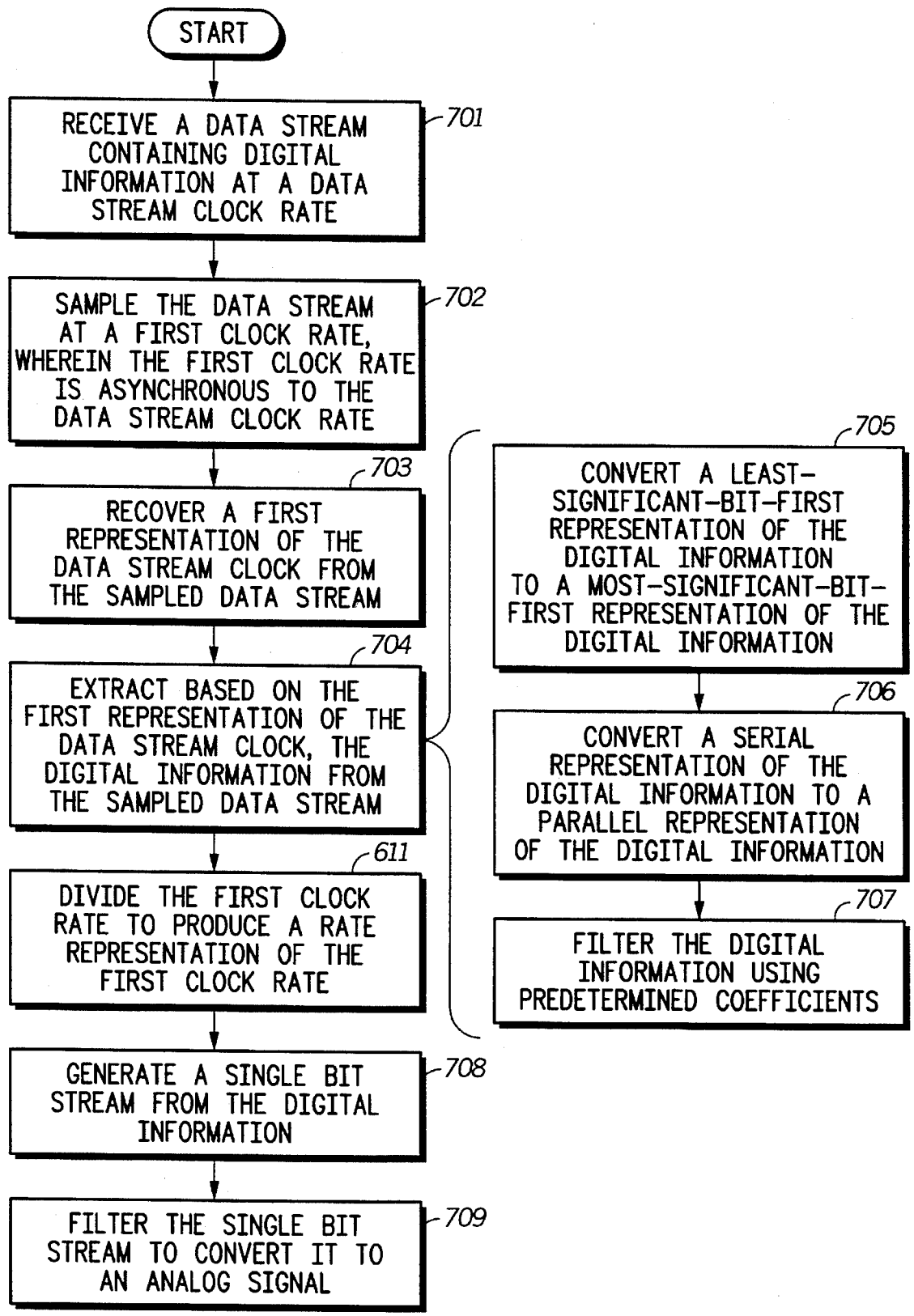
FIG. 7 illustrates, in a logic diagram, a method for converting an asynchronous data stream into an analog signal in accordance with the present invention.

FIG. 7 illustrates a logic diagram that may be used to implement an alternative embodiment of the present invention. At step 701, a data steam is received. This reception step is detailed in corresponding step 601 of FIG. 6. In step 702, the data stream is sampled which is detailed in corresponding step 602 of FIG. 6. At step 703, the first representation of the data stream clock is recovered which is detailed in corresponding step 603 of FIG. 6.

In step 704 the digital information of the data stream is extracted, which is detailed in corresponding step 609 of FIG. 6. The extraction step 704 can be further comprised of steps 705–707. At step 705, an LSB-first representation of the digital information is converted to a MSB-first representation of the digital information. In digital audio applications, the digital information which encodes the audio signal in the data stream is often formatted LSB-first, wherein this digital information needs to be converted to MSB-first format before being convened to an analog signal.

At step 706, a serial representation of the digital information is converted to a parallel representation of the digital information. In a digital audio application, the digital information, which is recovered in a serial format, often needs to be converted to parallel format before being converted to an analog signal.

In step 707, the digital information is filtered using predetermined coefficients. The filtering of step 707 can involve choosing the predetermined coefficients such that the resulting filtered digital information is an oversampled version of the incoming digital information. By oversampling the digital information, the quality of the analog signal that is eventually produced can be improved.

The first clock rate is divided by a divisor in step 611 to produce a rate representative of the first clock. A single bit stream is generated in step 708 when the digital information is converted, at the rate representative of the first clock, to a single bit stream representation of an analog signal. This single bit stream is then filtered at step 709, where it is converted to an analog signal. The filtering in step 709 is accomplished by integrating the ones and zeros in the single bit stream to create the resulting analog signal.

The present invention provides a method and apparatus for extracting digital information from an asynchronous data stream. By utilizing the method and apparatus described herein, the digital information can be recovered with minimal additional circuitry, cost, and susceptibility to noise. Typical prior art techniques require an analog PLL that recovers a clock which is used to recover the digital information. While this technique is effective, it is also costly, complicated, and susceptible to noise. By eliminating the need for the analog PLL, less circuitry is required, and the noise problem is avoided.

We claim:

1. An asynchronous data extraction apparatus comprising:

a first clock that provides a first clock signal having a first clock rate;

a data interface that samples a data stream at the first clock rate to produce a sampled data stream, wherein digital information of the data stream is formatted using a data stream clock, and wherein the first clock signal is not synchronized with the data stream clock;

a data stream clock recovery element that is operably coupled to the data interface and the first clock, wherein the data stream clock recovery element recovers a first representation of the data stream clock from the sampled data stream and wherein the first representation of the data stream clock is synchronous to the first clock signal, the data stream clock recovery element including:

an edge detector that detects edges in the sampled data stream to produce detected edges;

a missing edge detector operably coupled to the edge detector, wherein the missing edge detector produces an injected edge when the edge detector does not produce one of the detected edges within a predetermined amount of time; and a clock generator coupled to the edge detector and the missing edge detector, wherein the clock generator combines the detected edges and the injected edge to produce the first representation of the data stream clock; and a data extraction element operably coupled to the data interface and the data stream clock recovery element, wherein the data extraction element extracts the digital information using the first representation of the data stream clock.

2. The asynchronous data extraction apparatus of claim 1, wherein the missing edge detector comprises a counter.

3. A digital-to-analog converter comprising:

a first clock that provides a first clock signal having a first clock rate;

a data interface that samples a data stream at the first clock rate to produce a sampled data stream, wherein digital information of the data stream is formatted using a data stream clock, and wherein the first clock signal is not synchronized with the data stream clock;

a data stream clock recovery element that is operably coupled to the data interface and the first clock, wherein the data stream clock recovery element recovers a first representation of the data stream clock from the sampled data stream and wherein the first representation of the data stream clock is synchronous to the first clock signal;

a data extraction element operably coupled to the data interface and the clock recovery element, wherein the data extraction element extracts the digital information at the first representation of the data stream clock to produce extracted data;

a sigma-delta converter that is operably coupled to the data extraction element, wherein the sigma-delta converter converts, at a rate representative of the first clock signal, the extracted data into a single bit stream; and a low pass filter that is operably coupled to the sigma-delta converter, wherein the low pass filter converts the single bit stream into an analog signal.

4. The digital-to-analog converter of claim 3, wherein the data extraction element further comprises a preamble detector, wherein the preamble detector monitors the sampled data stream and produces a preamble detect output when a preamble bit sequence is detected in the sampled bit stream.

5. The digital-to-analog converter of claim 3, wherein the data extraction element further comprises a shift register, wherein the shift register converts a least-significant-bit-first representation of the digital information to a most-significant-bit-first representation of the digital information.

6. The digital-to-analog converter of claim 3, wherein the data extraction element further comprises a shift register, wherein the shift register converts a serial representation of the digital information to a parallel representation of the digital information.

7. The digital-to-analog converter of claim 3 further comprises a clock divider operably coupled to the first clock, wherein the clock divider divides the first clock signal by a divisor to produce the rate representative of the first clock signal.

8. The digital-to-analog converter of claim 3 further comprises a finite impulse response filter operably coupled to the data extraction element, the sigma-delta converter, and the data stream clock recovery element wherein the finite impulse response filter filters, based on predetermined coefficients, the extracted data.

9. An integrated circuit comprising:

a substrate having deposited thereon:

a first clock that provides a first clock signal having a first clock rate;

a data interface that samples a data stream at the first clock rate to produce a sampled data stream, wherein digital information of the data stream is formatted using a data stream clock, and wherein the first clock signal is not synchronized with the data stream clock;

a data stream clock recovery element that is operably coupled to the data interface and the first clock, wherein the data stream clock recovery element recovers a first representation of the data stream clock from the sampled data stream and wherein the first representation of the data stream clock is synchronous to the first clock signal;

a data extraction element operably coupled to the data interface and the clock recovery element, wherein the data extraction element extracts the digital information at the first representation of the data stream clock to produce extracted data;

a sigma-delta converter that is operably coupled to the data extraction element, wherein the sigma-delta converter converts, at a rate representative of the first clock signal, the extracted data into a single bit stream; and a low pass filter that is operably coupled to the sigma-delta converter, wherein the low pass filter converts the single bit stream into an analog signal.

10. A method for extracting asynchronous data, the method comprises the steps of:

receiving a data stream, wherein digital information of the data stream is formatted using a data stream clock;

sampling the data stream at a first clock rate to produce a sampled data stream, wherein the first clock rate is independent of the data stream clock rate;

detecting edges in the sampled data stream to produce detected edges;

monitoring the detected edges and producing an injected edge when one the detected edges is not produced within a predetermined amount of time; and combining the detected edges and the injected edge to produce the first representation of the data stream clock, wherein the first representation of the data stream clock is synchronous to the first clock signal; and extracting the digital information from the sampled data stream at the first representation of the data stream clock.

11. The method of claim 10 further comprises manipulating the digital information at a rate representative of the first clock rate.

12. The method of claim 11, wherein manipulating the digital information further comprises dividing the first clock rate by a divisor to produce the rate representative of the first clock rate.

13. The method of claim 11, wherein extracting the digital information further comprises extracting a frame synchronizing signal which is used in manipulating the digital information.

14. A method for converting a digital signal to an analog signal, the method comprises the steps of:

receiving a data stream, wherein digital information of the data stream is formatted using a data stream clock;

sampling the data stream at a first clock rate to produce a sampled data stream, wherein the first clock rate is independent of the data stream clock;

recovering a first representation of the data stream clock from the sampled data stream, wherein the first representation of the data stream clock is synchronous to the first clock rate;

extracting the digital information from the sampled data stream at the first representation of the data stream clock;

generating, from the digital information, a single bit stream at a rate representative of the first clock rate; and filtering the single bit stream to convert the single bit stream into an analog signal.

15. The method of claim 14, wherein the step of extracting the digital information further comprises monitoring the sampled data stream and producing a preamble detect output when a predetermined preamble bit sequence is detected.

16. The method of claim 14, wherein the step of extracting the digital information further comprises converting a least-significant-bit-first representation of the digital information to a most-significant-bit-first representation of the digital information.

17. The method of claim 14, wherein the step of extracting the digital information further comprises converting a serial representation of the digital information to a parallel representation of the digital information.

18. The method of claim 14 further comprises dividing the first clock rate by a divisor to produce the rate representative of the first clock rate.

19. The method of claim 14, further comprises, prior to the generating a single bit stream step, filtering the digital information using predetermined coefficients.

* * * * *